United States Patent
Geiser et al.

(10) Patent No.: US 12,104,828 B2
(45) Date of Patent: Oct. 1, 2024

(54) COILED TUBING FOR RADIATOR ENHANCED GEOTHERMAL SYSTEM

(71) Applicant: The Johns Hopkins University, Baltimore, MD (US)

(72) Inventors: Peter Anderson Geiser, Lyons, CO (US); Bruce D. Marsh, Hunt Valley, MD (US)

(73) Assignee: The Johns Hopkins University, Baltimore, MD (US)

( * ) Notice: Subject to any disclaimer, the term of this patent is extended or adjusted under 35 U.S.C. 154(b) by 1289 days.

(21) Appl. No.: 16/496,830

(22) PCT Filed: Mar. 23, 2018

(86) PCT No.: PCT/US2018/024077
§ 371 (c)(1),
(2) Date: Sep. 23, 2019

(87) PCT Pub. No.: WO2018/175920
PCT Pub. Date: Sep. 27, 2018

(65) Prior Publication Data
US 2020/0124324 A1 Apr. 23, 2020

Related U.S. Application Data

(60) Provisional application No. 62/476,223, filed on Mar. 24, 2017.

(51) Int. Cl.
*F24T 10/20* (2018.01)
*E21B 7/04* (2006.01)
(Continued)

(52) U.S. Cl.
CPC ............... *F24T 10/20* (2018.05); *E21B 7/04* (2013.01); *E21B 7/18* (2013.01); *E21B 43/305* (2013.01);
(Continued)

(58) Field of Classification Search
None
See application file for complete search history.

(56) References Cited

U.S. PATENT DOCUMENTS 3,765,477 A * 10/1973 Van Huisen ............ F24T 10/20
976/DIG. 425
3,878,884 A * 4/1975 Raleigh .................. E21B 43/26
166/308.1
(Continued)

FOREIGN PATENT DOCUMENTS

WO 2013169242 A1 11/2013
WO WO-2015132404 A1 * 9/2015 ............. E21B 43/17

OTHER PUBLICATIONS

Geiser et al., "The Radiator-EGS System: A Fresh Solution to Geothermal Heat Extraction", Jan. 26-28, 2015, 12 pages.
(Continued)

Primary Examiner — Wesley G Harris
(74) Attorney, Agent, or Firm — Harrity & Harrity, LLP (57) ABSTRACT

A radiator (RAD) enhanced geothermal system (EGS) may comprise a radiator vane heat exchanger (RVHE). The RVHE may be configured to be located in a plane defined by an injector well and a production well that is defined by a principal stress direction ($S_1$) of a plurality of principal stress directions and a maximum horizontal stress component ($SH_{max}$). The RVHE may include one or more stacked laterals oriented along $SH_{max}$. Each stacked lateral, of the one or more stacked laterals, may include one or more vertical branches oriented along $S_1$. The RVHE may be configured to extract energy from a non-hydrothermal source of energy.

20 Claims, 7 Drawing Sheets

(51) Int. Cl.
  *E21B 7/18* (2006.01)
  *E21B 43/30* (2006.01)
  *E21B 43/17* (2006.01)
  *E21B 43/26* (2006.01)
  *F24T 10/00* (2018.01)

(52) U.S. Cl.
  CPC ............... *E21B 43/17* (2013.01); *E21B 43/26* (2013.01); *F24T 2010/53* (2018.05); *Y02E 10/10* (2013.01)

(56) References Cited

U.S. PATENT DOCUMENTS

| | | | |
|---|---|---|---|
| 2007/0245729 A1* | 10/2007 | Mickleson | F01K 23/02 |
| | | | 60/641.2 |
| 2012/0080163 A1 | 4/2012 | Hoffman | |
| 2012/0255706 A1 | 10/2012 | Tadayon et al. | |
| 2013/0112402 A1 | 5/2013 | Harris et al. | |
| 2013/0220604 A1* | 8/2013 | El-Rabaa | E21B 43/26 |
| | | | 166/308.1 |
| 2015/0354859 A1 | 12/2015 | March et al. | |
| 2016/0153239 A1* | 6/2016 | Randall | E21B 23/14 |
| | | | 166/308.1 |
| 2016/0160568 A1 | 6/2016 | Randall | |

OTHER PUBLICATIONS

PCT International Search Report and Written Opinion corresponding to PCT/US18/24077, mailed Jun. 21, 2018, 8 pages.

\* cited by examiner

COILED TUBING FOR RADIATOR ENHANCED GEOTHERMAL SYSTEM

CROSS-REFERENCE TO RELATED APPLICATIONS

This application claims priority to International Application No. PCT/US2018/024077, filed Mar. 23, 2018, entitled "COILED TUBING FOR RADIATOR ENHANCED GEOTHERMAL SYSTEM", which claims priority to U.S. Provisional Application No. 62/476,223, filed Mar. 24, 2017, entitled "COILED TUBING FOR RAD EGS VANE MANUFACTURE", the entire contents of which are hereby incorporated by reference.

FIELD OF THE DISCLOSURE

The present disclosure relates to hydrothermal energy systems. More particularly, the present disclosure relates to systems and methods for harvesting geothermal energy from non-hydrothermal sources.

BACKGROUND OF THE DISCLOSURE

An increasingly critical problem for the world is access to energy sources to support society. Hydro-carbons are currently the principal source of energy for the world economy. However, the use of hydro-carbons presents two problems: 1) hydro-carbons are a finite non-renewable resource, and 2) hydro-carbons are the major source of $CO_2$ production that is driving the heating of the Earth's atmosphere. In terms of human energy needs, geothermal energy stands in marked contrast to hydro-carbon-based energy because geothermal energy is a renewable resource that emits no $CO_2$ or other greenhouse gas that would contribute to warming and also has a worldwide distribution. Unfortunately, the lack of an adequate design for a system that can extract sufficient quantities of heat for commercial energy production has limited geothermal energy production to naturally occurring hydrothermal systems, which represent only a small fraction of the total worldwide geothermal resources and are poorly distributed relative to energy needs. Accordingly, there is an urgent unmet need in the art for a system and method for harvesting geothermal energy from non-hydrothermal sources.

SUMMARY OF THE DISCLOSURE

Some aspects, described herein, may include additional aspects, such as any single aspect or any combination of aspects described herein.

Some aspects, described herein, provide a method for extracting geothermal heat from the Earth's crust by creating vertical fracture zones through which fluid may be circulated.

In some aspects, a Radiator (RAD) Enhanced Geothermal System (EGS) may include: a non-hydrothermal source of energy; an injector well; a production well; and a radiator vane heat exchanger (RVHE) located in a plane defined by the injector well and the production well that includes $S_1$ (a largest stress axis of a three dimensional ellipsoid stress field, such as a vertical or approximately vertical stress axis) and $SH_{max}$ (a maximum horizontal stress component of a stress axis of the three dimensional ellipsoid stress field, such as a horizontal component of stress axis vector $S_2$), wherein the RVHE includes one or more stacked laterals oriented along $SH_{max}$, each stacked lateral having one or more vertical branches oriented along $S_1$.

In an aspect, the one or more stacked laterals are 1, 2, 3, 4, 5, 6, 7, 8, 9, 10, 11, 12, 13, 14, 15, or more stacked laterals.

In an aspect, the one or more vertical branches each include one or more sub-branches.

In an aspect, the one or more sub-branches each include a plurality of coiled tubing boreholes having a Menorah-like configuration.

In an aspect, the plurality of coiled tubing boreholes having a Menorah-like configuration include 3, 4, 5, 6, 7, 8, 9, or 10 coiled tubing boreholes.

In an aspect, the plurality of coiled tubing boreholes having a Menorah-like configuration include 4, 5, 6, or 7 coiled tubing boreholes.

In an aspect, the plurality of coiled tubing boreholes having a Menorah-like configuration includes 5 coiled tubing boreholes.

In an aspect, the injector well and the production well each includes a vertical pilot hole and a lateral.

In an aspect, the injector well and the production well are each connected to a pumping unit.

In an aspect, the injector well and the production well are oriented parallel to a maximum horizontal stress axis.

In an aspect, the injector well and the production well are drilled to a position (depth) where a principal stress axis is vertical.

In an aspect, the position is a depth of less than approximately 700 meters (m).

In an aspect, the injector well is drilled from the surface to a depth that is greater than the depth of a minimum temperature ($T_{min}$) isotherm and then to a depth that is approximately at a maximum temperature ($T_{max}$) isotherm.

In an aspect, the vane is created using a steerable hydraulic jetting nozzle.

In an aspect, a method for harvesting geothermal energy may include: creating an EGS power unit in a non-hydrothermal source; drilling an injector well oriented to parallel a maximum horizontal stress at a depth where a principal stress axis is vertical; drilling a production well oriented to parallel a maximum horizontal stress at a depth where a principal stress axis is vertical; and generating a radiator vane heat exchanger (RVHE) located in a plane defined by the injector well and the production well that includes $S_1$ and $SH_{max}$ with a steerable hydraulic jetting nozzle, wherein the RVHE includes one or more stacked laterals oriented along $SH_{max}$, each stacked lateral having one or more vertical branches oriented along $S_1$.

In an aspect, the method further includes the step of extracting fluid with a temperature and volume that is sufficiently high and large enough (i.e., a temperature that satisfies a threshold and a volume that satisfies a threshold) to allow the commercial production of energy.

In an aspect, the method further involves optimizing the system to operate for a predetermined number of years before extracted fluid falls below a minimum temperature needed for energy production.

In an aspect, the method further includes the step of controlling the geometry and orientation of the radiator vane by precision drilling with a steerable hydraulic jetting nozzle.

In an aspect, the stacked laterals are separated by a vertical distance of about 50-250 m. In an aspect, the stacked laterals are separated by a vertical distance of about 100-200 m. In an aspect, the stacked laterals are separated by a vertical distance of about 50-150 m. In an aspect, the stacked laterals are separated by a vertical distance of about 100 m.

In an aspect, the plurality of coiled tubing boreholes having a Menorah-like configuration is within the same vertical planes or minus about 10°.

In an aspect, the plurality of coiled tubing boreholes having a Menorah-like configuration is an odd number of coiled tubing boreholes.

In an aspect, the plurality of coiled tubing boreholes having a Menorah-like configuration is an even number of coiled tubing boreholes.

In some aspects, a radiator (RAD) enhanced geothermal system (EGS) may comprise a radiator vane heat exchanger (RVHE). The RVHE may be configured to be located in a plane defined by an injector well and a production well that is defined by a principal stress direction (S1) of a plurality of principal stress directions and a maximum horizontal stress component ($SH_{max}$). The RVHE may include one or more stacked laterals oriented along $SH_{max}$. Each stacked lateral, of the one or more stacked laterals, may include one or more vertical branches oriented along s1. The RVHE may be configured to extract energy from a non-hydrothermal source of energy.

In some aspects, a method may include drilling an injector well oriented to parallel a maximum horizontal stress (SHmax) at a depth where a principal stress axis is vertical; drilling a production well oriented to parallel SHmax at the depth where the principal stress axis is vertical; and disposing a radiator vane heat exchanger (RVHE) in a plane defined by the injector well and the production well that includes a principal stress direction (S1¬) and SHmax. The RVHE may include one or more stacked laterals oriented along SHmax. A stacked lateral, of the one or more stacked laterals, may be associated with one or more vertical branches oriented along S1.

In some aspects, a system may include a radiator (RAD) enhanced geothermal system (EGS). The RAD EGS may include a radiator vane heat exchange having a plurality of stacked laterals oriented along a maximum horizontal stress component. Each of the plurality of stacked laterals may include at least one vertical branch oriented in a principal stress direction to form a menorah-like configuration. The system may include a plurality of energy equipment. The plurality of energy equipment may include a pumping unit and an energy extractor. The system may include a control device to cause the pumping unit to pump a fluid into the RAD EGS to enable the energy extractor to extract geothermal energy from the RAD EGS.

BRIEF DESCRIPTION OF THE DRAWINGS

The accompanying drawings provide visual representations, which will be used to more fully describe the representative aspects disclosed herein and can be used by those skilled in the art to better understand them and their inherent advantages. In these drawings, like reference numerals identify corresponding elements and:

FIG. 1 illustrates that RAD EGS vanes are vertical rectangular solids with a base that is a lateral well bore that supplies the fluid to be heated by the surrounding hot rock as it rises through the manufactured fracture zone.

FIG. 2 illustrates that a method of meeting the dimensional requirements of a RAD EGS Vane is to perforate the well casing, thus creating a series of holes through which the fracturing medium can exert the forces required to fracture the rock. This method allows the fracturing media to escape the well. The extent of the fracturing is controlled by both the orientation of the holes with respect to the stress field, as well as the mechanical heterogeneities of the rock.

FIG. 3 demonstrates a new capability for coiled tubing directional drilling, which allows a more complex pattern of holes to be drilled relative to other techniques for drilling.

In FIG. 4, the coiled tubing holes are open. The ability to disperse the force of the fracking medium can be utilized to construct a RAD EGS vane. For example, the coiled tubing holes create a threshold width and reduce the quantity of stacked laterals required to achieve the necessary vane height. FIG. 4 illustrates schematically how a coiled tubing design may be used to create a high permeability fracture zone of any width or height according to an exemplary aspect of the disclosure.

FIG. 5 illustrates schematically an example of how coiled tubing may be used in a Menorah-like configuration in combination with stacked laterals to create a RAD EGS Vane according to an illustrative aspect of the disclosure. $S_1$, $S_2$, and $S_3$ refer to the three principal stress directions, in which $S_1$ is largest, $S_2$ is intermediate, and $S_3$ is the minimum.

DETAILED DESCRIPTION

The presently disclosed subject matter now will be described more fully hereinafter with reference to the accompanying drawings, in which some, but not all aspects of the disclosures are shown. Like numbers may refer to like elements throughout. The presently disclosed subject matter may be embodied in many different forms and should not be construed as limited to the aspects set forth herein. Indeed, many modifications and other aspects of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific aspects disclosed and that modifications and other aspects are intended to be included within the scope of the appended claims.

Geothermal energy may be used for power generation, home heating, and/or the like. However, extraction of geothermal energy from non-seismically active locations, such as locations that do not have active hot springs, may be difficult.

Small diameter (e.g., 2 centimeter (cm) to 8 cm, 3 cm to 7 cm, 4 cm to 6 cm, and the like) continuous coiled tubing coupled to a steerable hydraulic jetting nozzle may be used as a borehole drilling system to create a plurality (e.g., 3, 4, 5, 6, 7, 8, 9, 10, and the like) of hydraulically jetted coiled tubing boreholes emanating from a horizontal parent wellbore in a Menorah-like configuration. For example, a high pressure fluid system may be used to drill vertical vanes, with fracturing media ejected from perforations in a wellbore to create a vane with a particular orientation. However, a desired width (e.g., 40 meters (m) to 60 m) may not be achieved from ejection of fracturing media from a wellbore. According to the techniques herein, the Menorah-like configuration of boreholes is able to spread the effects of a fracking medium over a wider area than is possible with a single hole that only has the ability to focus the fracturing forces in a direction normal to the plane of the whole. Advantageously, the ability of the Menorah-like configuration to disperse the force of a fracking medium improves Radiator (RAD) Enhanced Geothermal Systems (EGS) Vane technology by creating a threshold vane width and by reducing the quantity of stacked laterals used to achieve a threshold vane height.

This disclosure relates to the creation of vertical fracture zones through which fluids can be circulated. Vertical fracture zones are important for the performance of certain EGS, in particular the RAD EGS. The RAD EGS is a method for extracting geothermal heat from the Earth's crust by emulating the natural design of hydrothermal systems. These systems include approximately vertical zones of fractured rock with high permeability. The zones allow cool water to enter hot rocks and be heated by rising through the fractured rock. The RAD EGS Vanes are volumes of fractured rock manufactured by the application of rock fracturing media such as hydraulic fracturing or solid propellant. The media may be capable of high precision fracturing so that the dimensions of the vane satisfy a threshold to meet the demands of supplying a threshold volume of fluid at temperatures satisfying a threshold to allow commercial energy production (i.e., a threshold level of energy production).

As noted above, geothermal energy has several advantages relative to hydrocarbon-based energy because geothermal energy is a renewable resource that does not commit any $CO_2$ or other greenhouse gases that contribute to global warming, and is found in geological systems around the world. Unfortunately, the lack of an adequate design for a system that can extract sufficient quantities of heat for commercial energy production has limited the resource to hydrothermal systems which represent only a small fraction of the total resource and is poorly distributed relative to energy needs. The vast bulk of geothermal energy occurs in Hot Dry Rocks (HDR) and Hot Sedimentary Aquifers (HSA) both of which are much more widely distributed than hydrothermal. Some aspects, described herein provide a RAD EGS design that enables access to the HDR and HSA geothermal resources.

RAD EGS aspects provide an enhanced geothermal system (EGS) configured to allow the commercial production of electrical energy. In particular, such systems provide that the temperature and volume of the fluids extracted are of sufficiently high temperatures and large enough volumes as to allow the commercial production of electrical energy. In some RAD EGS systems, fractures are separated from each other by a sufficiently large volume of rock relative to the fractures' surface area, such that ratio of the rate of heat extraction to the rate of heat supply controlled by the thermal conductivity of the rock is such that the intervening rock is cooled at a rate that is sufficiently (e.g., within a threshold amount of a particular value) slow to be economical.

The structure of some RAD EGS systems includes a set of "manufactured" vertical fractures that can circulate fluids through a rock volume such that the final fluid temperature is sufficient for commercial energy production. Some RAD EGS systems create such fractures by imitating the way that natural transmissive fracture systems are created, but do so in a manner that emulates the geometry of radiator vanes, so as to allow control of the system's temperature. The geometry and orientation of the radiator system's fractures are controlled by the ambient stress field including S1, the maximum stress, and $SH_{max}$, the horizontal stress component (see e.g., FIG. 1). Below about 700 m, and based on the specific geologic area, $S_1$ is vertical and the average strike of transmissive fractures corresponds to $SH_{max}$.

Creating fractures that include $S_1$ and $SH_{max}$ may include drilling laterals that parallel $SH_{max}$. This is normal to the direction that may be chosen for exploiting unconventional oil and gas which are drilled normal to $SH_{max}$. Fracking to "manufacture" the transmissive fracture system requires a highly controllable fracking tool such as energetics, which can directionally enhance the rock permeability. For example, propellant based fracking can be used to manufacture the transmissive fracture system. Because $S_1$ is vertical, fracture orientations will tend towards Mode 1 which tends to limit permeability. However, there should be sufficient variability in orientation of fragment surfaces such that multiple fracture surfaces will have a significant shear component and therefore provide permeability.

Figure 1:
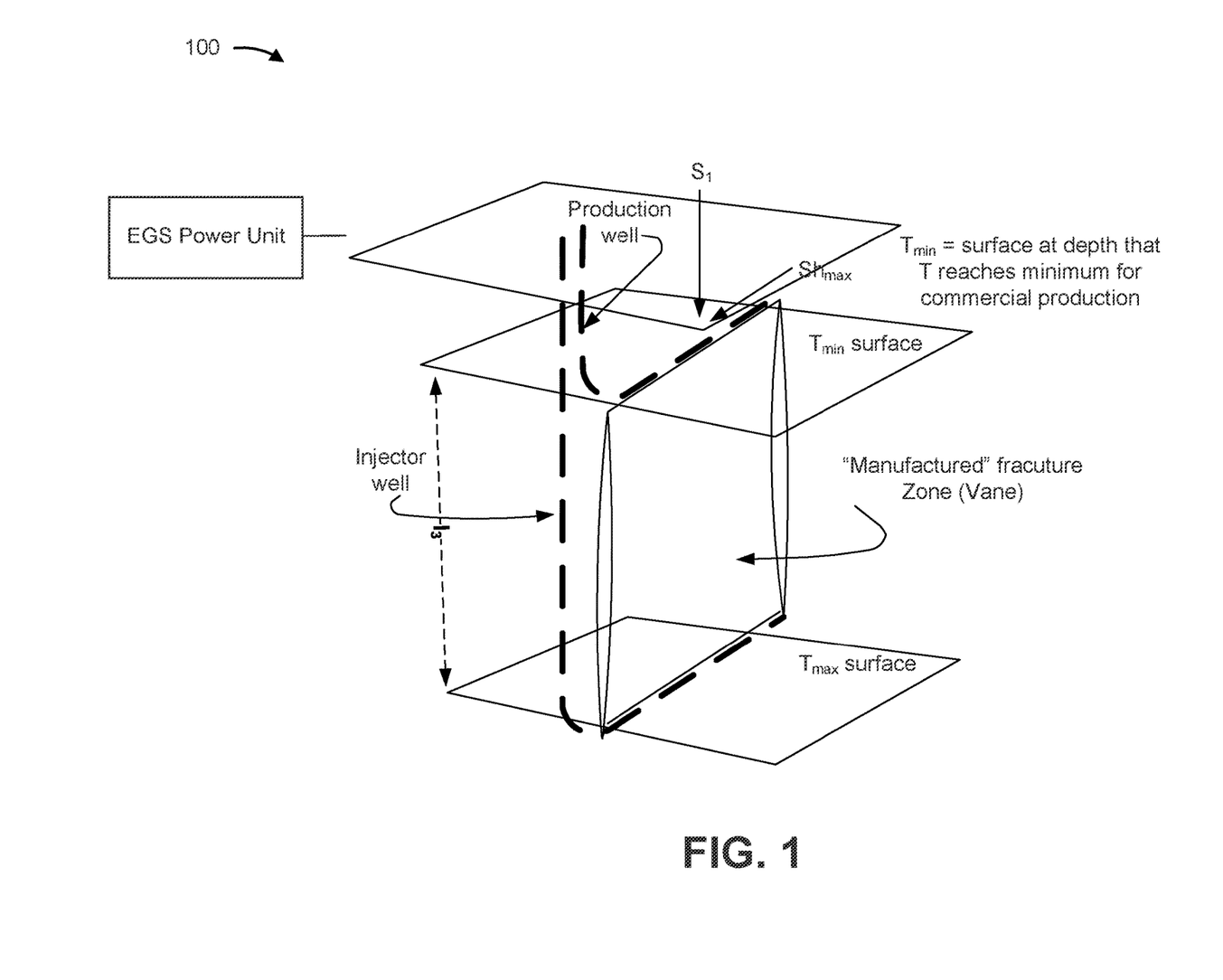
FIG. 1 illustrates an example graphical view 100 of a Radiator (RAD) Enhanced Geothermal Systems (EGS) Vane.
Figure 2:
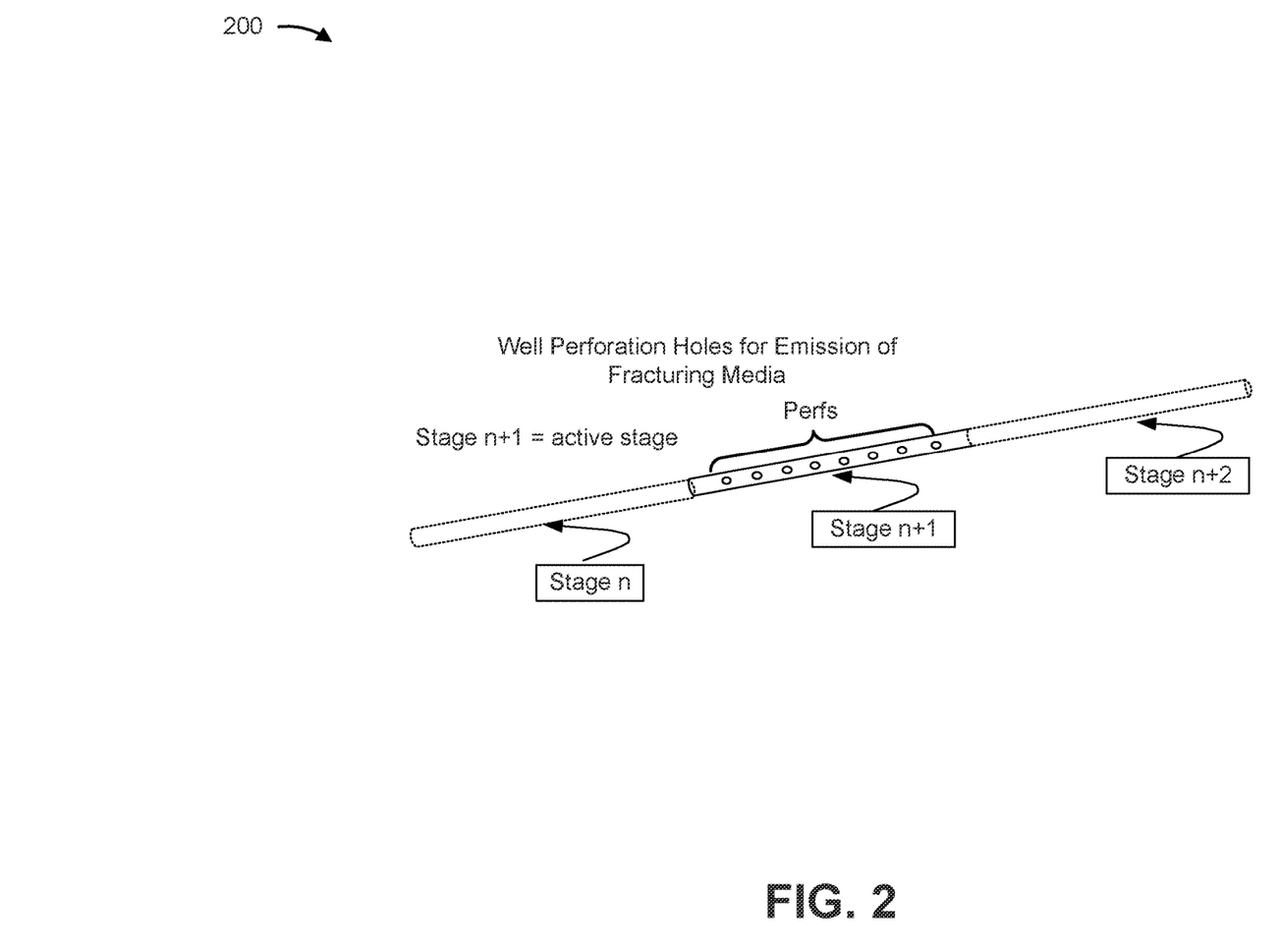
FIG. 2 illustrates example graphical views 200 of a method of perforation (perfing) for control of fracturing media.

Some RAD EGS designs provide vanes that are vertical rectangular solids with a base that is a lateral well bore that supplies the fluid to be heated by the surrounding hot rock as it rises through the manufactured fracture zone (see e.g., FIG. 1). Constructing such a RAD EGS vane includes creating a fractured zone with sufficient width and minimizing the number of stacked laterals required to achieve the necessary vane height. In order to meet the dimensional requirements of the RAD EGS vane the location of the stresses generated by the fracturing media is precisely controlled by simply perforating the well casing to create a series of holes through which the fracturing medium can exert the forces required to fracture the rock (see e.g., FIG. 2).

In some methods of perfing to allow the fracturing media to escape the well, the extent of the fracturing is controlled by both the orientation of the holes with respect to the stress field as well as the mechanical heterogeneities of the rock. The fractures may propagate parallel or at an acute angle to the maximum principal stress $S_1$ (see e.g., FIG. 1). Thus the maximum dimension is roughly parallel to $S_1$ and the minimum normal to $S_1$. The dimensions of fracture zones thus produced may not be well known and may vary based on rock type. Some lengths are approximately 10-15 m and widths are approximately 1-3 m.

Modeling of the RAD EGS to determine the amount of time that the system can generate temperatures≥150° C. indicate that the width of the fracture zone may be important. Initial modeling indicates that vane widths may satisfy a threshold of approximately 60 m. Effectively, this means that some methods for perf design, a series of equally spaced holes situated along the length of the well, may not produce the necessary 10's of meter widths for the RAD EGS vanes. Thus an alternative method may be required to achieve the necessary dimensions.

According to some techniques described herein, a steerable coiled tubing drilling system may be used to create a RAD EGS vane having Menorah-like sub-structures with finely controlled dimensions and a more complex spatial configuration that increases the width of the RAD EGS vane, while reducing the quantity of stacked laterals to achieve an optimal RAD vane height. In particular, some techniques herein enable construction of a RAD EGS vane including a plurality of coiled tubing boreholes having a Menorah-like configuration on each stacked lateral, where each Menorah-like configuration emanates from a single perforation hole on the stacked lateral, as shown in FIG. 3.

Coiled tubing drilling is a method for rapid drilling of "thin holes" and may be done with a relatively narrow (e.g., 2 centimeter (cm) to 8 cm, 3 cm to 7 cm, 4 cm to 6 cm, and/or the like) diameter flexible metal pipe and uses a continuous pipe rather than a jointed pipe.

Figure 3:
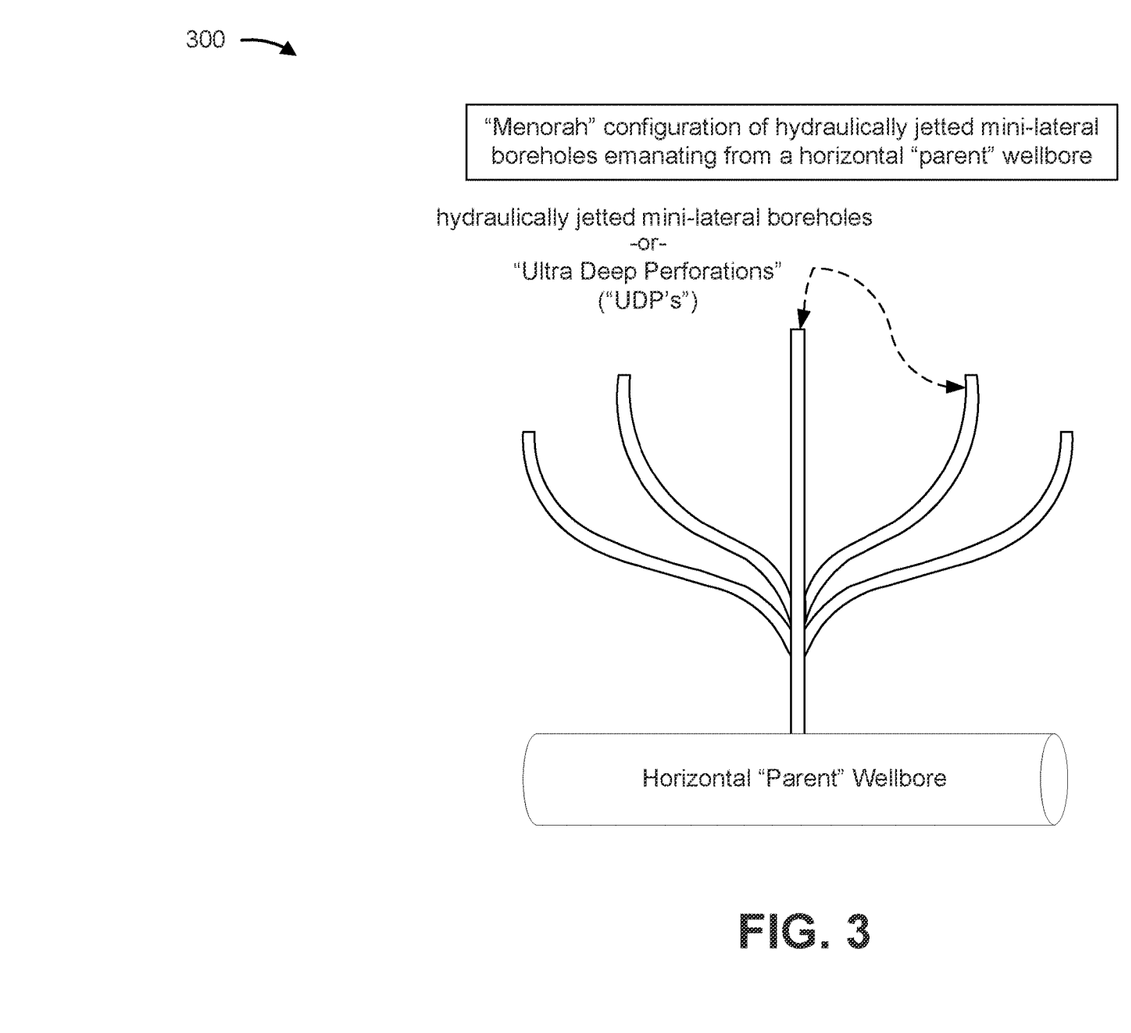
FIG. 3 illustrates an example 300 of a Menorah-like configuration of hydraulically jetted coiled tubing boreholes emanating from a horizontal "parent" wellbore according to an aspect of the disclosure.
Figure 4:
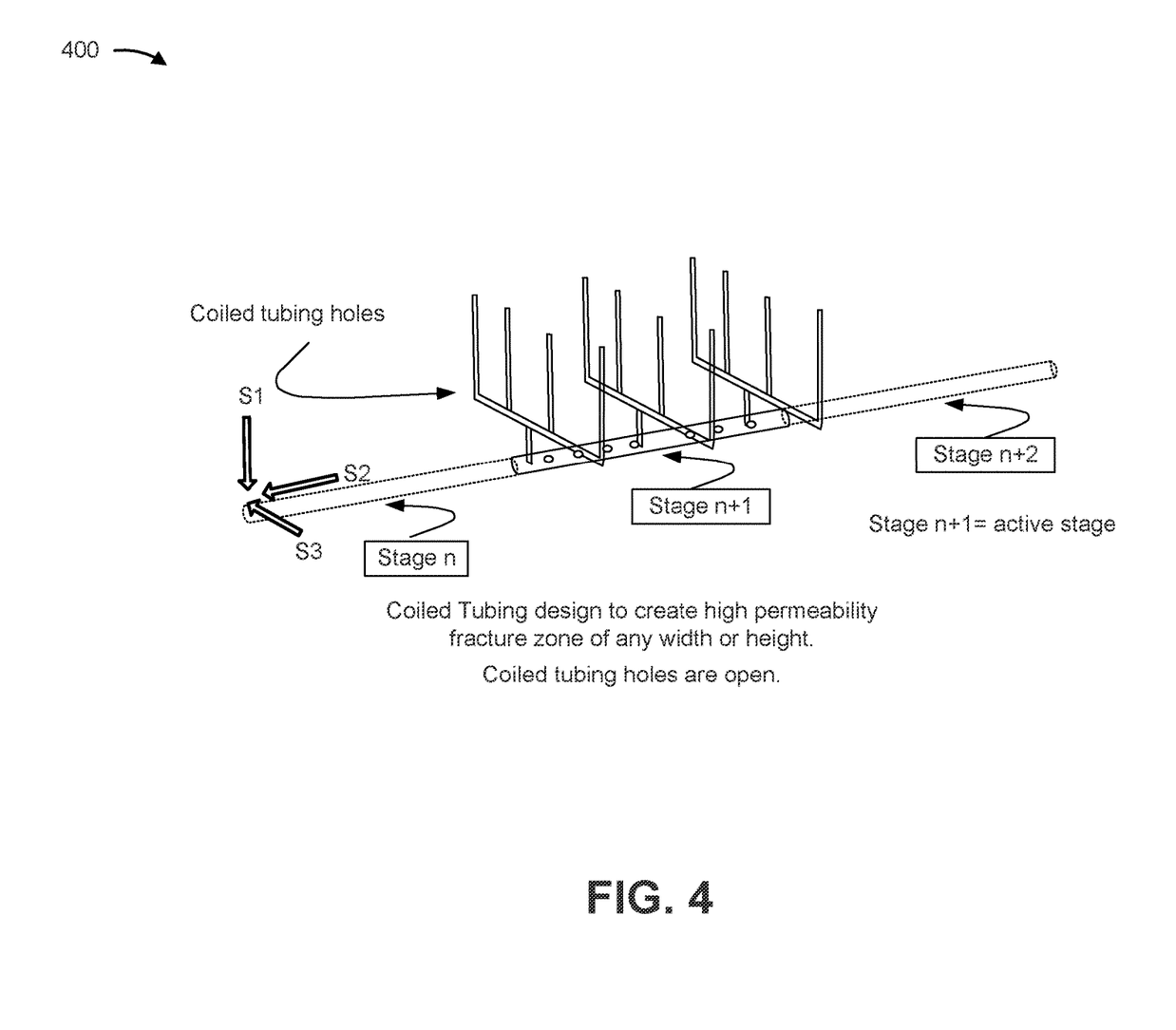
FIG. 4 illustrates an example graphical view 400 of the coiled tubing design used to create high permeability fracture zone of any width or height according to an aspect of the disclosure.
Figure 5:
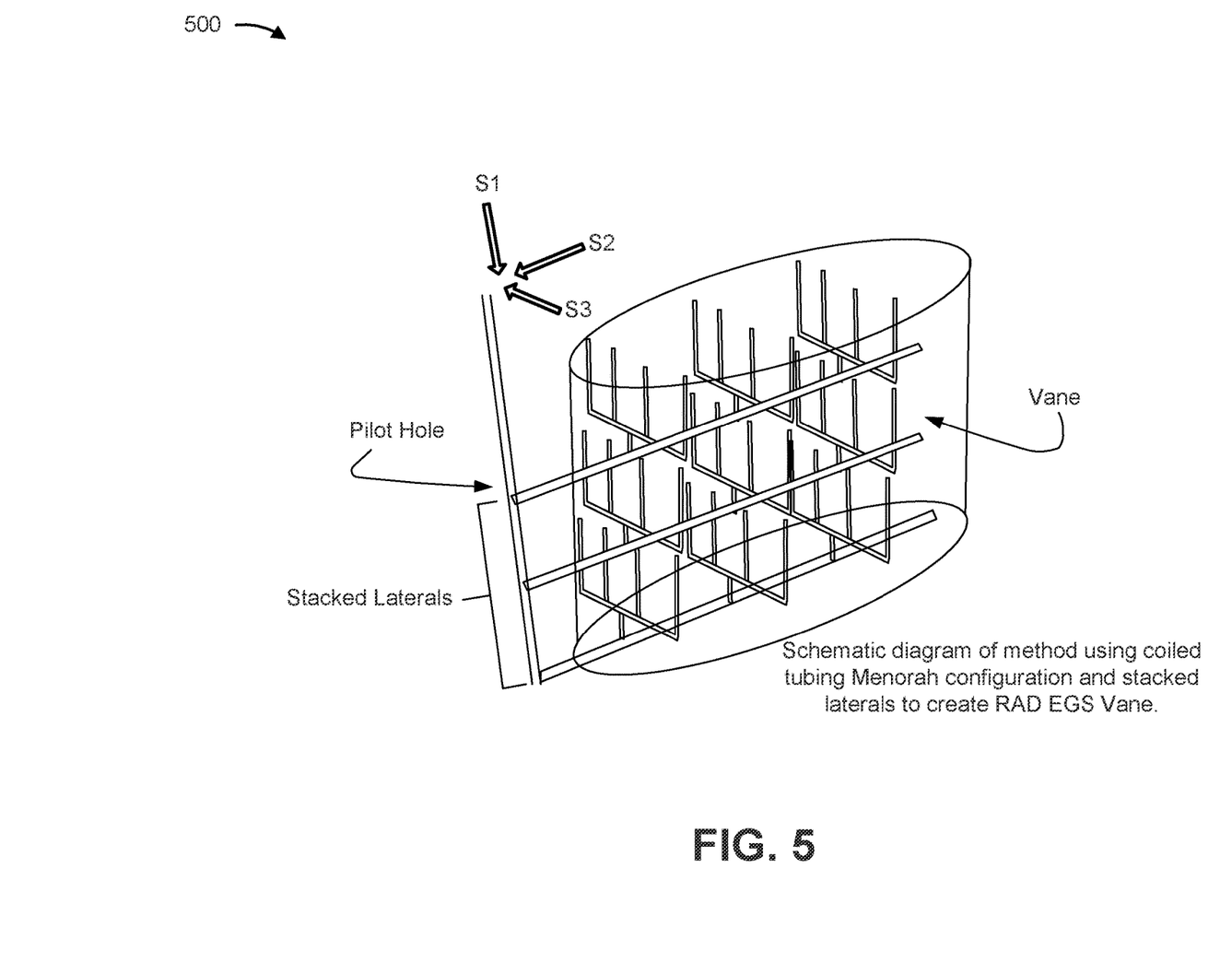
FIG. 5 illustrates a graphical view 500 of a schematic diagram of the method using a coiled tubing Menorah-like configuration and stacked laterals to create a RAD EGS Vane according to an aspect of the disclosure.

A plurality of coiled tubing boreholes having a Menorah-like configuration according to an aspect of the disclosure is shown emerging from a single perf hole in a horizontal well bore, and may have a quantity of "branches" selected for the width and height of the RAD EGS vane (e.g., 3, 4, 5, 6, 7, 8, 9, 10, and/or the like) as shown in FIG. 3. The Menorah-like configuration may spread the effects of the fracking medium over a wider area than is possible with a single hole, which focuses the fracturing forces in a direction normal to the plane of the hole. The ability to disperse the force of the fracking medium can be utilized to create a threshold width and to reduce a quantity of stacked laterals to achieve a threshold vane height. FIG. 4 and FIG. 5 show an example, schematically, of how this might be accomplished in some aspects.

Although the following description contains specific details, they should not be construed as limiting the scope of the method. Rather, they are provided as an illustration of one possible approach utilizing coiled tubing to create a RAD EGS vane.

According to the techniques herein, a RAD EGS vane having finely controlled dimensions and a more spatially complex Menorah-like configuration having a plurality of branches (e.g., 3, 4, 5, 6, 7, 8, 9, 10, and the like) may be generated by drilling a pilot hole with a geometry and plunge angle selected for the particular environment to the $T_{max}$ isotherm depth (see e.g., FIG. 1: RAD EGS Vane). The pilot hole may or may not serve as the injector well for the vane. One or more laterals may then be drilled from the pilot hole parallel to the $T_{max}$ isotherm. Generally, the one or more laterals will be spaced apart by a vertical distance of about 50, 100, 150, 200, 250 m, or more. In a typical vane, it is contemplated that the one or more stacked laterals may be spaced apart by a vertical distance of about 100 m.

A degree of curvature within an individual branch in the Menorah-like configuration may be built up relatively gradually to facilitate retraction of the coiled tubing drilling system upon completion of the drilling for the individual branch. Additionally, each branch within the Menorah-like configuration may have a maximum length equal to that of the length of the coiled tubing drilling system (e.g., jetting hose). FIG. 3 shows an example of a Menorah-like configuration in which four branches stem from a central "stem." Although aspects, described herein, are described in terms of a Menorah-like configuration with a plurality of branches from a central stem, other configurations are possible, such as a configuration where the initiation point of each branch is not restricted to the central "stem." Rather, additional sub-branches may be initiated from other branches. Additionally, while the aspect in FIG. 3 shows two sets of paired branches, it is contemplated within the scope of the disclosure that each branch in the Menorah-like configuration could be initiated from points relative to any three-dimensional axis. For example, branches within the Menorah-like configuration may be paired in the same horizontal plane (as shown in FIG. 3) or they may be staggered in the same horizontal plane. The Menorah-like configuration may include an odd or even number of branches, and any number of branches selected to construct an EGS vane optimal for the geothermal feature. In some aspects, branches within the Menorah-like configuration may not be within the same vertical plane (e.g., they may emanate at angles less than 180° relative to one another). In some aspects, the plurality of coiled tubing boreholes having a Menorah-like configuration may be within the same vertical plane plus or minus about 10°. In some aspects, the plurality of coiled tubing boreholes may vary from the aforementioned configurations.

A set of stages may be created along a lateral such that each stage includes one or more peripheral sub-structures, each having a Menorah-like configuration above the lateral. The height of the Menorah-like configuration may be designed to minimize the number of additional stacked laterals necessary to create the overall RAD EGS Vane. Additionally, the width of the Menorah-like configuration may be set by the size required to provide sufficient contact with the hot rock so as to maintain the vane for a period of time such that sufficient commercial energy can be created to make the RAD EGS profitable. For example, for a Menorah-like configuration in a zone of approximately 1 kilometer (km) by 1 km and with a thickness of approximately 40 meters (m) by 60 m, a temperature of approximately 150 degrees Celsius (C) may be sufficient for commercial uses and a temperature of between approximately 60° C. and 80° C. may be sufficient for direct heating uses. Other example temperatures and sizes may be used. The distance between stages may set by the distance that enables successive fracks capable of creating fractures of sufficient length to intersect those created by the previous stage.

Successive stacked laterals may be drilled such that each successive lateral makes sufficient contact with the top of the fracture zone created by the previous lateral below it such that the integrity of the permeability field created by the previous lateral is considered sufficient. Stage location along each successive stacked lateral may be determined by locating each successive stacked lateral at places along the lateral where contact with the lower fracture zone is considered most likely to maintain continuity of the permeability field previously created.

The drilling of successively higher stacked laterals continues until the top of the fracture permeability field created above the lateral reaches the $T_{min}$ isotherm (FIG. 1: RAD EGS Vane).

A production well may drilled to the top of the vane where one or more laterals are drilled to harvest the heated fluid which consists of that which is both injected and supplied by the reservoir fracture systems.

Figure 6:
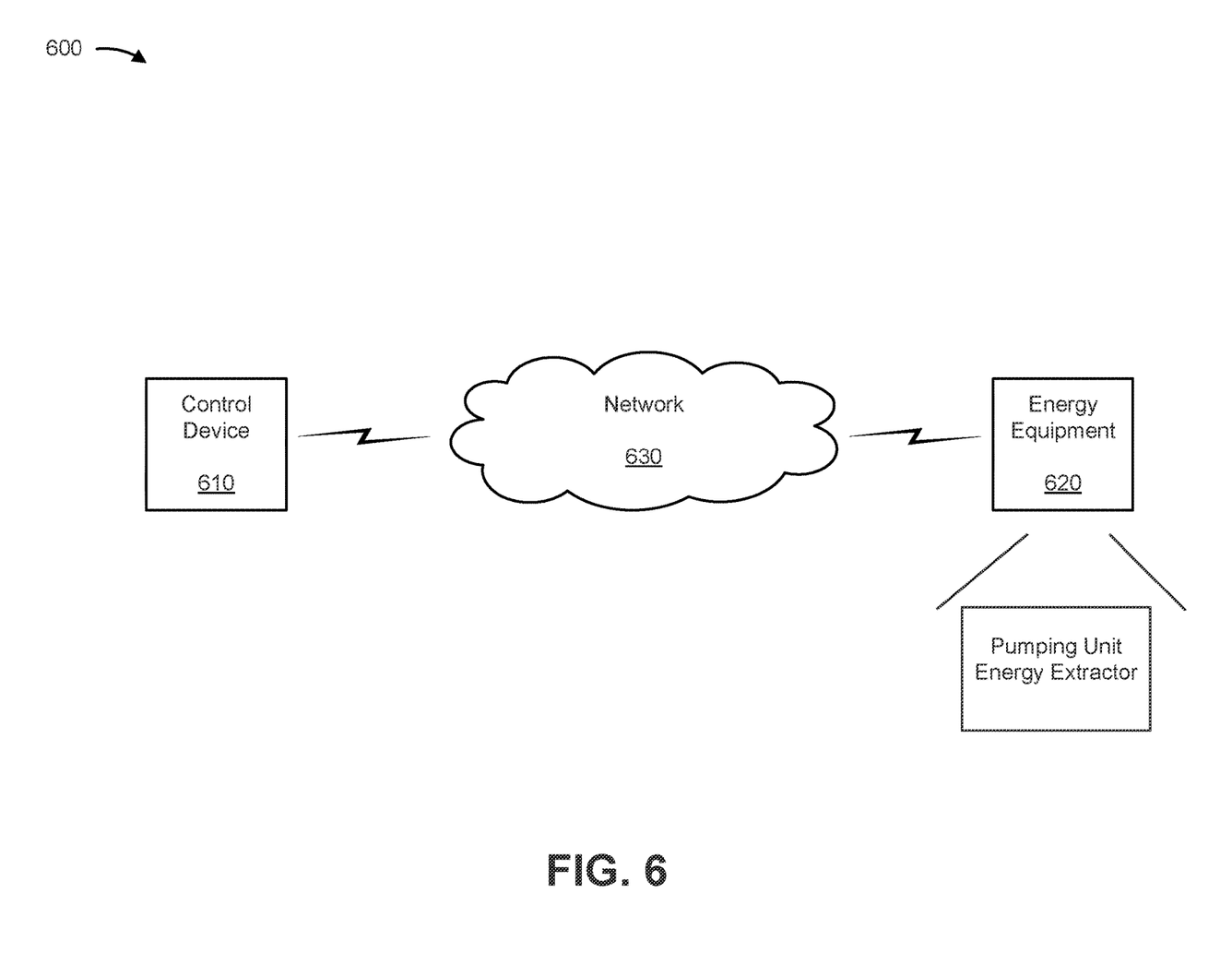
FIG. 6 is a diagram of an example environment 600 in which systems and/or methods, described herein, may be implemented.

FIG. 6 is a diagram of an example environment 600 in which systems and/or methods, described herein, may be implemented. As shown in FIG. 6, environment 600 may include control device 610, energy equipment 620, network 630, and/or the like. Devices of environment 600 may interconnect via wired connections, wireless connections, or a combination of wired and wireless connections.

Control device 610 includes one or more devices capable of receiving, generating, storing, processing, and/or providing information associated with controlling manufacture of and/or energy extraction from a radiator enhanced geothermal system. For example, control device 610 may include a communication and/or computing device, such as a mobile phone (e.g., a smart phone, a radiotelephone, etc.), a computer (e.g., a laptop computer, a tablet computer, a handheld computer, a desktop computer), a wearable communication device (e.g., a smart wristwatch, a pair of smart eyeglasses, etc.), or a similar type of device. In some aspects, control device 610 may include a control unit. In some aspects, control device 610 may include a server (e.g., connected to energy equipment 620 via a Controller Area Network (CAN)).

Energy equipment 620 includes one or more devices capable of receiving, generating, storing, processing, and/or providing information associated with manufacturing and/or extracting energy from a radiator enhanced geothermal system. For example, energy equipment 620 may include a borehole drilling system, a pumping unit, an energy extractor (e.g., a heat exchanger, a power generation device, a turbine, and/or the like), and/or the like. In some aspects, energy equipment 620 may include a continuous coiled tubing coupled to a steerable hydraulic jetting nozzle borehole drilling system.

Network 630 includes one or more wired and/or wireless networks. For example, network 630 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a controller area network (CAN), or the like, and/or a combination of these or other types of networks The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
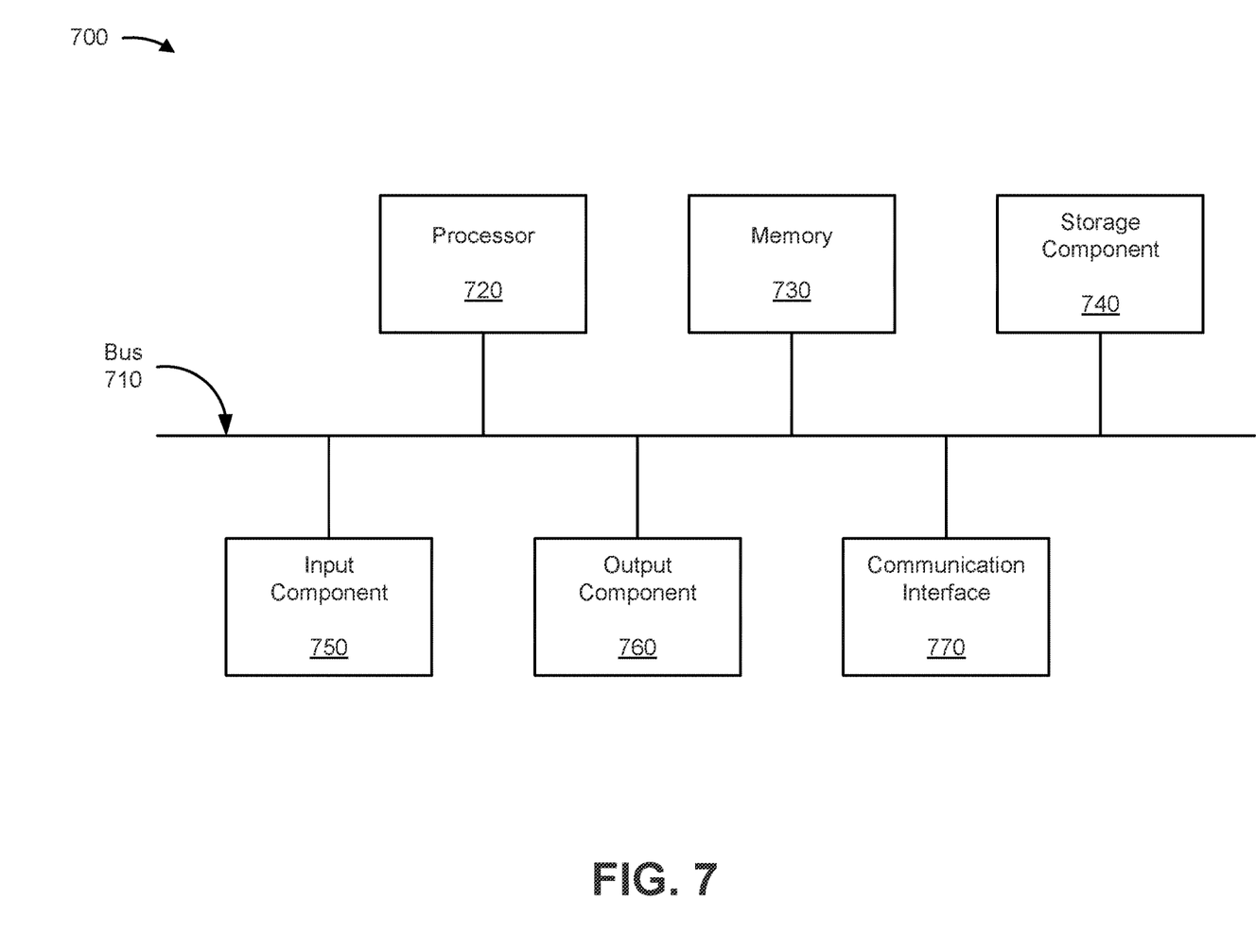
FIG. 7 is a diagram of example components of one or more devices 700 of FIG. 6.

FIG. 7 is a diagram of example components of a device 700. Device 700 may correspond control device 610, energy equipment 620, and/or the like. In some aspects, control device 610, energy equipment 620, and/or the like may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a wireless local area network interface, a cellular network interface, or the like.

Device 700 may perform one or more processes described herein. Device 700 may perform these processes based on processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software.

Some aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like. Some aspects are described herein as being "sufficient." As used herein, sufficient may refer to a value being with a threshold amount of a particular value. For example, the a first value may be a known threshold relating to an activity, and the second value may be sufficient for the activity based on exceeding the first value, being less than the first value, equaling the first value, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A radiator (RAD) enhanced geothermal system (EGS), comprising:
   a radiator vane heat exchanger (RVHE),
      wherein the RVHE is configured to be located in a plane defined by an injector well and a production well that is defined by a principal stress direction (S1) of a plurality of principal stress directions and a maximum horizontal stress component (SHmax),
      wherein the RVHE comprises:
         one or more stacked laterals oriented along the SHmax;
         one or more vertical branches oriented along the S1 and connected to each of the one or more stacked laterals; and
         a plurality of coiled tubing boreholes emanating from the one or more vertical branches,
            wherein the plurality of coiled tubing boreholes include a plurality of sub-branches; and
      wherein the RVHE is configured to extract energy from a non-hydrothermal source of energy.

2. The RAD EGS of claim 1, wherein the one or more stacked laterals includes greater than a threshold quantity of stacked laterals, and
   wherein the threshold quantity is at least one of: 1, 2, 3, 4, 5, 6, 7, 8, 9, 10, 11, 12, 13, 14, or 15.

3. The RAD EGS of claim 1, wherein the plurality of coiled tubing boreholes include a threshold quantity of coiled tubing boreholes, and
   wherein the threshold quantity is at least one of: 3, 4, 5, 6, 7, 8, 9, or 10.

4. The RAD EGS of claim 1, wherein the plurality of coiled tubing boreholes are disposed within 10 degrees of a common vertical plane.

5. The RAD EGS of claim 1, wherein the one or more stacked laterals include a first stacked lateral and a second stacked lateral,
   wherein the first stacked lateral and the second stacked lateral are separated by a vertical distance of a threshold range, and
   wherein the threshold range is at least one of:
      between 50 meters (m) and 250 m,
      between 100 m and 200 m, or
      between 50 m and 150 m.

6. The RAD EGS of claim 1, further comprising:
   the plane defined by the injector well; and
   the production well that is defined by the S1 and the SHmax,
      wherein the injector well includes a first vertical pilot hole and a first lateral and the production well includes a second vertical pilot hole and a second lateral.

7. The RAD EGS of claim 1, further comprising:
   a pumping unit, wherein the RAD EGS is coupled to the pumping unit.

8. The RAD EGS of claim 1, further comprising:
   the plane defined by the injector well; and
   the production well that is defined by the S1 and the SHmax,
      wherein the injector well and the production well are oriented parallel to the SHmax.

9. The RAD EGS of claim 1, wherein the principal stress direction is vertical.

10. The RAD EGS of claim 1, wherein the RAD EGS is disposed at a depth of less than 700 m.

11. The RAD EGS of claim 1, wherein the RAD EGS is disposed at a depth that is greater than a depth of minimum temperature (Tmin) isotherm and less than a depth of maximum temperature (Tmax) isotherm.

12. The RAD EGS of claim 1, wherein at least a portion of the RAD EGS is created using a steerable hydraulic jetting nozzle.

13. The RAD EGS of claim 1, wherein geothermal energy is harvested from the non-hydrothermal source of energy using the production well and the injector well.

14. A method, comprising:
   drilling an injector well oriented to parallel a maximum horizontal stress (Shmax) at a depth where a principal stress axis is vertical;
   drilling a production well oriented to parallel the SHmax at the depth where the principal stress axis is vertical; and
   disposing a radiator vane heat exchanger (RVHE) in a plane defined by the injector well and the production well that includes a principal stress direction (S1) and the SHmax, wherein the RVHE comprises:
one or more stacked laterals oriented along the SHmax,
wherein the one or more stacked laterals include the injector well oriented to parallel to the SHmax;
one or more vertical branches oriented along the S1 and connected to the one or more stacked laterals; and
a plurality of coiled tubing boreholes emanating from the one or more vertical branches,
wherein the plurality of coiled tubing boreholes include a plurality of sub-branches.

15. The method of claim 14, wherein disposing the RVHE comprises:
disposing the RVHE using a steerable hydraulic jetting nozzle.

16. The method of claim 14, further comprising:
coupling an enhanced geothermal system (EGS) power unit to an end of the production well and an end of the injector well.

17. The method of claim 14, further comprising:
harvesting geothermal energy from a non-hydrothermal source using the production well and the injector well.

18. A system, comprising:
a radiator (RAD) enhanced geothermal system (EGS),
wherein the RAD EGS includes a radiator vane heat exchange comprising:
a plurality of stacked laterals oriented along a maximum horizontal stress component,
wherein each of the plurality of stacked laterals includes at least one vertical branch oriented in a principal stress direction,
one or more vertical branches oriented along the principal stress direction and connected to the plurality of stacked laterals; and
a plurality of coiled tubing boreholes emanating from the plurality of stacked laterals,
wherein the plurality of coiled tubing boreholes include a plurality of sub-branches,
a plurality of energy equipment,
the plurality of energy equipment including a pumping unit and an energy extractor; and
a control device to cause the pumping unit to pump a fluid into the RAD EGS to enable the energy extractor to extract geothermal energy from the RAD EGS.

19. The system of claim 18, wherein the geothermal energy is harvested from a non-hydro-thermal source.

20. The system of claim 18, wherein the geothermal energy is harvested from a non-hydro-thermal source based on a production well associated with the RAD EGS and an injector well associated with the RAD EGS.

* * * * *